Patented May 28, 1940

2,202,502

UNITED STATES PATENT OFFICE 2,202,502

SULPHURIZED DIHYDRONAPHTHALENE DIMER AND PROCESS FOR MAKING SAME

Paul La Frone Magill, Ransomville, N. Y., assignor to E. I. du Pont de Nemours & Company, Wilmington, Del., a corporation of Delaware No Drawing. Application August 30, 1937, Serial No. 161,628

10 Claims. (Cl. 260—139)

This invention relates to sulphurized hydrocarbon products, to their preparation and to their use as lubricant assistants in lubricating compositions.

One object of this invention is to provide a method for preparing new sulphur reaction products with dimers of dihydronaphthalene. A further object is to provide improved lubricating compositions which contain the above sulphurized products as lubricant assistants, and to provide a method for incorporating such products into lubricating compositions such as cutting oils, extreme pressure lubricants and the like. Other objects will be apparent from the ensuing description of my invention.

The above objects may be accomplished in accordance with my invention by heating a dihydronaphthalene dimer with sulphur to form a sulphur reaction product of the dihydronaphthalene dimer and, when it is desired to employ the product as a lubricant assistant, incorporating the product into a lubricating oil.

I have discovered that sulphur may be reacted with dihydronaphthalene dimers to give products which appear to be definite chemical compounds, although the nature of the reaction involved and the exact identity of the products formed are not entirely understood. Thus, when 1,2-dihydronaphthalene dimer is heated with sulphur, a reaction takes place to produce a light straw colored, clear liquid, the molecular weight of which varies with the amount of sulphur employed in the reaction and generally increases as the sulphur content is increased. The reaction occurs substantially without hydrogen sulphide evolution, which distinguishes it from the reaction of sulphur with aliphatic compounds. If an excess of sulphur is employed, the sulphur in excess of that amount required to give a product containing about 11% of sulphur separates from the mixture upon cooling to room temperature. Indications are that a product with a molecular weight of about 290 is obtained when the maximum amount of sulphur is employed and the product is freed from unreacted sulphur.

The dihydronaphthalene dimers which are suitable for preparing these sulphurized products are the dimers of 1,4-dihydronaphthalene and 1,2-dihydronaphthalene. The dimer of 1,4-dihydronaphthalene may be prepared by the method of Scott and Walker as described in their U. S. Patent 2,055,708, issued September 29, 1936. In its crude state, as it is obtained by this method, it is a colorless, or slightly yellow, viscous liquid at room temperature, distilling at 200–230° C. at a pressure of 1–3 mm. of mercury. It has a pour point of about 10–15° C., depending upon its degree of purity, and it solidifies to a hard brittle resin at a temperature of −10 to 0° C. When relatively pure, it has a molecular weight of about 260.

The dimer of 1,2-dihydronaphthalene may be prepared by rearranging 1,4-dihydronaphthalene, to 1,2-dihydronaphthalene by the method of Straus and Lemmel, Ber. 46, 232, and then polymerizing the resulting product using sulphuric acid as the catalyst. The polymerization step is best carried out at 35–40° C. using a 10% concentration of 80% sulphuric acid. After about 5 to 8 hours at said temperature the mixture is heated to 60–70° C. at which temperature the sulphuric acid separates as a separate phase and may be drawn off. The dimer of 1,2-dihydronaphthalene is a colorless or slightly yellow, viscous liquid which tends to crystallize slowly upon long standing at room temperature. It has a molecular weight of about 260 and distills at about 210° C. at a pressure of 2 mm. of mercury. The product as prepared by the above method may contain some 1,4-dihydronaphthalene dimer or monomeric dihydronaphthalene as an impurity, which is not objectionable for the present use.

I prefer to use the dimer of 1,2-dihydronaphthalene in the preparation of my new sulphurized product, since it is more easily obtainable in quantity. However, either dimer or mixtures of the two may be employed with excellent results in accordance with my invention. It is not necessary that the dimer be employed in a pure condition since the crude products which are obtained by the methods referred to above are entirely suitable for the present purpose.

The preparation of my new sulphurized products is illustrated by the following example wherein 1,2-dihydronaphthalene dimer is employed.

Example

Four mols, 1040 grams, of 1,2-dihydronaphthalene dimer were heated by means of an oil bath to a temperature of about 100° C. Four atoms, 128 grams, of sulphur were then added in increments while the dimer was being stirred and heated slowly to a temperature of 150–160° C. After the sulphur was added, the mixture was maintained at this temperature for a period of 1½ hours after which it was cooled to room temperature. The product obtained was a clear, straw colored liquid which contained 10% of sulphur. Upon long standing at room temperature, a solid product tended to separate from the liquid.

It is not necessary that the sulphur be added in increments as described in the above example. If desired, a mixture of the dihydronaphthalene dimer and sulphur may be prepared and then subjected to careful heating employing a temperature of about 140–170° C. for 1 to 2 hours in order to complete the reaction. It is generally desirable, in order to reduce the fire hazard, to carry out the heating under an inert atmosphere, e. g., nitrogen.

In a run similar to that described in the above example, twice the amount of sulphur, e. g., 2 atoms of sulphur per mole of dimer, was employed. It was found that only about one-half of the sulphur was retained in the product, the remainder separating from the reaction mixture upon cooling to room temperature. Apparently the sulphur forms a true compound, a monosulphide of the dihydronaphthalene dimer, having a molecular weight of about 290 when in purified condition. However, especially when the reaction is not carried to completion, the crude product often will contain unreacted sulphur in solution.

My invention is not limited to the use of specific proportions of sulphur and dihydronaphthalene dimer in preparing the sulphurized product. However, there is no advantage in employing sulphur in quantities greater than that required to give a product containing approximately 11% sulphur since sulphur in excess of this amount separates from the mixture. The use of reactants in the proportion of about 0.5 to 1 atom of sulphur to 1 mol of dihydronaphthalene dimer is generally preferred. When such proportions are used, the reaction product will contain about 5.8 to 11% of sulphur. Smaller amounts of sulphur may be employed. However, since the product is particularly useful as a source of sulphur, as will be described later, I prefer to use sulphur in the amounts above mentioned.

If an excess of sulphur is employed in the reaction, or if the reaction is not carried out to completion, sulphur which is unreacted but merely dissolved in the reaction product may be removed therefrom by treating the reaction mixture with a solvent, e. g., petroleum ether, in which sulphur is insoluble, whereby the unreacted sulphur is precipitated in solid form. The desired product may be separated from its solution in petroleum ether by distillation of the solvent. For most purposes, the presence of impurities such as small amounts of unreacted sulphur is not objectionable and for some uses may be an advantage and purification of the reaction mixture is not necessary.

The rate of reaction between the sulphur and the dihydronaphthalene dimer usually is not sufficiently rapid at temperatures substantially below 140° C. for practical purposes. I prefer to carry out the reaction at a temperature of 140–170° C., although higher temperatures may be employed. However, too high a temperature, e. g., temperatures at which hydrogen sulphide evolution becomes appreciable, should be avoided. In general, a temperature of 140–170° C. is entirely satisfactory.

The sulphurized products obtained from dihydronaphthalene dimers in accordance with my invention are soluble in various organic solvents and particularly in the hydrocarbon solvents and their chlorinated products. Thus, they are soluble in petroleum and vegetable oils, the ordinary chlorinated hydrocarbon solvents, benzene, toluene, waxes and greases and the like. Because they are readily soluble in such solvents, these sulphurized products are of potential value for many purposes wherein sulphur or sulphurized products are required. In particular, I have found that they are well suited for use as lubricant assistants in lubricating compositions such as cutting oils, extreme pressure lubricants, greases and the like.

The products are particularly suitable for use in cutting oils since they not only appreciably increase and improve the lubricating properties of the composition but also are easily miscible with the oil base to give clear, transparent, light colored compositions which are generally desired in cutting oils. By means of my invention, relatively large amounts of sulphur may be added to the cutting oil without darkening the same. This is an important advantage since light colored, transparent oils are generally considered essential for cutting oil applications. The amount of sulphurized product, e. g., the reaction product of dimeric 1,2-dihydronaphthalene with suphur, that need be added to the oil will vary with the use for which the oil is intended. In general, I find it suitable to add the sulphurized product in such a quantity so as to give a sulphur content in the cutting oil composition of approximately 1 to 3%.

The use of sulphur in extreme pressure lubricants, greases and the like is known to increase the load capacity of the composition. I have discovered that the present sulphurized products are excellent sources of sulphur for use in such lubricants. The sulphur reaction product may be added to give any desired sulphur content in the lubricating composition. In general, an amount sufficient to give 1 to 3% of sulphur is entirely satisfactory. Under such circumstances the load carrying capacity may be markedly increased.

My invention is not limited to the addition of the above described sulphurized products to oils of any particular viscosity nor to hydrocarbon oils since such compositions may be added to high or low viscosity mineral oils, including greases, as well as to oils of vegetable origin with excellent results.

Because my products are readily soluble in oils of all types, including synthetic oils, they may be easily incorporated in any desired amount into cutting oils or extreme pressure lubricants and the like. If the composition into which my product is to be incorporated is relatively viscous at ordinary temperature, it is best to employ heat so as to facilitate thorough dispersion of the sulphurized product therein.

It is to be understood that that modification of my invention which relates to the use of the present sulphurized products as lubricant assistants is not limited to particular concentrations mentioned above since the amount of sulphur desired in lubricating compositions may vary within wide limits depending upon the particular use for which such compositions are desired. It will be apparent to those skilled in the preparation of such compositions that the present sulphurized products may be employed to give any desired sulphur content within wide limits.

In the foregoing, I have described the preferred embodiments of my invention and various modifications thereof. It is to be understood that the present invention is not to be limited to such embodiments since they are merely illustrative and not restrictive of my invention. My invention is to be limited only by the scope of the appended claims.

In the appended claims the term "lubricating compositions" is used to designate oleaginous compositions which have lubricating properties regardless of whether the lubricating base is a synthetic oil or is of mineral or vegetable origin. It also designates compositions of high or low viscosity including, for example, cutting oils, light lubricating oils, extreme pressure lubricating compositions, greases and the like. The term "lubricating oil" is used to designate any solid or liquid substance which has recognized lubricating properties and includes substances of either vegetable or mineral origin. "Cutting oils" are special lubricants used to lubricate and cool various cutting tools, in machine tools such as lathes, milling machines and the like.

I claim:

1. A process comprising reacting a dihydronaphthalene dimer with sulphur between the temperature at which sulphurization begins and that at which evolution of hydrogen sulphide becomes appreciable.

2. A process comprising heating a dihydronaphthalene dimer with sulphur at a temperature of 140–170° C.

3. A process comprising heating a dihydronaphthalene dimer with sulphur in the proportion of 1 mol of dimer to about 0.5 to 1 atom of sulphur at a temperature of 140–170° C.

4. A process comprising reacting 1,2-dihydronaphthalene dimer with sulphur between the temperature at which sulphurization begins and that at which evolution of hydrogen sulphide becomes appreciable.

5. A process comprising heating 1,2-dihydronaphthalene dimer with sulphur at a temperature of about 140–170° C.

6. A process comprising heating 1,2-dihydronaphthalene dimer with sulphur in the proportion of 1 mol of dimer to about 0.5 to 1 atom of sulphur at a temperature of about 140–170° C.

7. A composition of matter comprising essentially a reaction product of a dihydronaphthalene dimer and sulphur.

8. A composition of matter comprising essentially a reaction product of a dihydronaphthalene dimer and sulphur, containing about 5.8 to 11% of sulphur.

9. A composition of matter comprising essentially a reaction product of 1,2-dihydronaphthalene dimer and sulphur.

10. A composition of matter comprising essentially a reaction product of 1,2-dihydronaphthalene dimer and sulphur, containing about 5.8 to 11% sulphur.

PAUL LA FRONE MAGILL.